US012054662B2

(12) United States Patent
Mudaliar et al.

(10) Patent No.: US 12,054,662 B2
(45) Date of Patent: Aug. 6, 2024

(54) FIRE-RETARDANT COMPOSITION, PROCESS OF PREPARATION AND KIT THEREOF

(71) Applicant: UPL LIMITED, Mumbai (IN)

(72) Inventors: Chandrasekhar Mudaliar, Maharashtra (IN); Maneesh Sharma, Maharashtra (IN); Prashant Vasant Kini, Maharashtra (IN)

(73) Assignee: UPL LTD, Mumbai (IN)

( * ) Notice: Subject to any disclaimer, the term of this patent is extended or adjusted under 35 U.S.C. 154(b) by 0 days.

(21) Appl. No.: 17/619,620

(22) PCT Filed: Jun. 15, 2020

(86) PCT No.: PCT/IB2020/055565
§ 371 (c)(1),
(2) Date: Dec. 16, 2021

(87) PCT Pub. No.: WO2020/254936
PCT Pub. Date: Dec. 24, 2020

(65) Prior Publication Data
US 2022/0298421 A1 Sep. 22, 2022

(30) Foreign Application Priority Data

Jun. 20, 2019 (IN) .............................. 201921024496

(51) Int. Cl.
| C09K 21/14 | (2006.01) |
| C09D 5/14 | (2006.01) |
| C09D 5/18 | (2006.01) |

(52) U.S. Cl.
CPC ................ C09K 21/14 (2013.01); C09D 5/14 (2013.01); C09D 5/18 (2013.01)

(58) Field of Classification Search
None
See application file for complete search history.

(56) References Cited

U.S. PATENT DOCUMENTS

| 4,978,460 A | 12/1990 | Von Blucher et al. |
| 5,520,575 A * | 5/1996 | Dickson ............... A22B 5/0082 |
| | | 452/128 |

(Continued)

FOREIGN PATENT DOCUMENTS

| CN | 1760260 A | 4/2006 |
| CN | 1826155 A | 8/2006 |

(Continued)

OTHER PUBLICATIONS

CN 102319499 A, English Language discription, (Year: 2012).*

(Continued)

*Primary Examiner* — Joseph D Anthony
(74) *Attorney, Agent, or Firm* — CANTOR COLBURN LLP

(57) ABSTRACT

The present invention is related to a fire-retardant composition comprising: a superabsorbent polymer; a viscosity control agent; and an antimicrobial agent wherein said composition when added to water creates enhanced water mixture appropriate for fire suppression. The present invention provides a fire-retardant composition of starch based superabsorbent polymer with protectant and suppressant action yet safer to the environment. The present invention further provides process, method, use and kit thereof.

11 Claims, 2 Drawing Sheets

Control Nutrient agar plate inoculated with sterile water

Nutrient agar plate inoculated with composition without antimicrobial agent

Nutrient agar plate inoculated with composition with antimicrobial agent

(56) References Cited

U.S. PATENT DOCUMENTS

| | | | |
|---|---|---|---|
| 5,989,446 A | 11/1999 | Hicks et al. | |
| 6,245,252 B1 | 6/2001 | Hicks et al. | |
| 6,380,300 B1* | 4/2002 | Cordova | A61K 8/042 |
| | | | 524/555 |
| 7,189,337 B2 | 3/2007 | Sortwell | |
| 8,834,750 B1 | 9/2014 | Glenn et al. | |
| 2002/0192340 A1* | 12/2002 | Swart | A23B 7/154 |
| | | | 426/234 |
| 2005/0095210 A1* | 5/2005 | Mattai | A61K 8/8152 |
| | | | 424/65 |
| 2008/0247978 A1* | 10/2008 | Mattai | A61K 8/044 |
| | | | 424/66 |
| 2011/0044969 A1* | 2/2011 | Rudi | A61K 31/192 |
| | | | 424/754 |
| 2012/0277099 A1* | 11/2012 | Olson | C09D 5/14 |
| | | | 47/57.6 |
| 2014/0034864 A1 | 2/2014 | Kern et al. | |
| 2016/0030789 A1 | 2/2016 | Cordani | |
| 2018/0305618 A1* | 10/2018 | Shirsat | C09K 17/40 |

FOREIGN PATENT DOCUMENTS

| | | |
|---|---|---|
| CN | 101052442 A | 10/2007 |
| CN | 104072928 A | 10/2014 |
| CN | 105283490 A | 1/2016 |
| CN | 107429034 A | 12/2017 |
| CN | 109045545 A | 12/2018 |
| CN | 109477000 A | 3/2019 |
| CN | 109809793 A | 5/2019 |
| JP | H09248454 A | 9/1997 |
| WO | 2006056379 A2 | 6/2006 |
| WO | 2009032587 A1 | 3/2009 |
| WO | WO 2016/162783 A1 * | 10/2016 |

OTHER PUBLICATIONS

CN107376186 A, English Language discription, (Year: 2017).*
CN 107524012 A, English Language Abstract. (Year: 2017).*
CN 107722804 A, English Language Abstract. (Year: 2018).*
International Search Report and Written Opinion for Interntional Application No. PCT/IB2020/055565; International Filing Date: Jun. 15, 2020; Date of mailing; Aug. 17, 2020; 9 pages.

* cited by examiner

Control Nutrient agar plate inoculated with sterile water

Nutrient agar plate inoculated with composition without antimicrobial agent

Nutrient agar plate inoculated with composition with antimicrobial agent

FIRE-RETARDANT COMPOSITION, PROCESS OF PREPARATION AND KIT THEREOF

CROSS REFERENCE TO RELATED APPLICATIONS

This application is a National Stage application of PCT/IB2020/055565, filed Jun. 15, 2020, which claims priority to Indian Patent Application 201921024496, filed Jun. 20, 2019, both of which are incorporated by reference in their entirety herein.

FIELD OF THE INVENTION

The present invention relates to a fire-retardant composition. The present invention more particularly relates to a fire-retardant composition when allowed to be mixed with water, creates an enhanced water mixture appropriate for fire suppression.

BACKGROUND OF THE INVENTION

Fire is a threat to life, wild life, property, and natural, suburban, and urban landscapes worldwide. In suburban, urban, and industrial areas, fire can result in billions of dollars in damage from loss of lives, property, equipment, and infrastructure. Fire is a rapid oxidation of material in the chemical process of combustion, releasing heat, light, and various reaction products. Fire and its constructs are often described by the 'Fire Tetrahedron', which defines heat, oxygen, fuel, and a resultant chain reaction as the four constructs required to produce fire; removing any one will prevent fire from occurring.

Water is the material of choice to extinguish most fires or to prevent combustible objects from burning. Water predominantly is supplied from a network of pipes or, in the case of a forest fire, for example, from natural waters. In fire-fighting, water contacts burning objects which results in sufficient cooling such that the burning objects fall below their combustion or ignition temperature, and new ignition is precluded. In addition, when water contacts hot objects, the water vaporizes to produce steam, which expands and expels the air necessary for combustion. When a fire is extinguished by spraying water on the fire, less than 10% w/w of the sprayed water is effective because of water loss, such as by run-off or evaporation. This is particularly disadvantageous in the case of forest fires and wildfires because a considerable portion of the water often is transported a long distance at a great expense, and then is wasted.

To overcome water's limitations as a fire-fighting resource, additives have been developed to enhance water's capacity to extinguish fires. Some of these additives include water-swellable polymers, such as cross-linked acrylic or acrylamide polymers, that can absorb water many times of their weight, forming gel-like particles swollen with absorbed water. Once dispersed in water, these water-logged particles can be sprayed directly onto a fire, reducing the amount of time and water necessary for fighting fires, as well as the amount of water run-off.

Other additives include acrylic acid copolymers cross-linked with polyether derivatives, which are used to impart thixotropic properties on water. Such thixotropic mixtures become thin under shear forces, allowing them to be sprayed from hoses onto burning structures or land; once those shear forces are removed, the mixture thickens, allowing it to cling to, and coat surfaces, extinguish flames, and prevent fire from spreading, or the structure from re-igniting.

These additives capable of swelling in water are generally referred as superabsorbent polymers (SAPs) available in a variety of chemical forms, including substituted and unsubstituted natural and synthetic polymers, such as hydrolysis products of starch acrylonitrile graft polymers, carboxymethylcellulose, crosslinked polyacrylates, crosslinked and partially neutralized copolymers of isobutylene and maleic anhydride, saponification products of vinyl acetate-acrylic acid copolymer, sulfonated polystyrenes, hydrolyzed polyacrylamides, polyvinyl alcohols, polyethylene oxides, polyvinylpyrrolidones, and polyacrylonitriles.

The SAPs are added to the water as an additive for fire-fighting purpose. The SAPs are highly absorptive and can absorb in a short time about 100 to 200-fold of their weight of water without, however, being dissolved in water.

Despite of its excellent fire suppressing property, the major drawback associated while using SAP is the difficulty of mixing it with water. When SAP is added to water as an additive, it forms lumps due to instant agglomeration of superabsorbent polymers in water. The inherent property of superabsorbent polymers necessarily requires few seconds to several minutes to swell before they become capable of holding water and act as fire-fighting mixture. This swelling of superabsorbent polymers as they come in contact with the water prevents formation of uniform dispersion and superabsorbent polymers aggregate together to form lumps. Once lumps are formed, it becomes extremely difficult to disperse these polymers to obtain uniform dispersion.

Attempts have been made in past to obtain uniform dispersion of superabsorbent polymers to obtain water appropriate for fire suppression.

U.S. Pat. No. 7,189,337B2 discloses a method for applying water-laden polymer particles to a surface to prevent and/or extinguish a fire. The method involved a dispersion comprising a water-swellable polymer, vegetable oil and surfactant or stabilizing agent as an additive. The drawback with such dispersion is that the oil component may facilitate re-ignition of objects after the water is evaporated.

U.S. Pat. No. 4,978,460 describes using an aqueous system comprising dry absorbent polymers to extinguish and/or prevent fires. The dry, solid polymer particles are encased by a water-soluble release agent to prevent agglutination of the particles. Diammonium biphosphate is used as the release agent that protects the gelatinizing agent from becoming sticky upon the penetration of water and thus from agglutinating. When using the release agent according to the invention, the dispersing of the gelatinizing substance takes place without any problem. The drawback of such system is that degradation profile of diammonium biphosphate may release noxious gases which might be harmful to people as well as the surroundings.

U.S. Pat. Nos. 5,989,446 and 6,245,252 discloses water additive composition containing a cross-linked, water-swellable polymer additive in a water/oil emulsion produced by an inverse phase polymerization reaction to be added to the firefighting water. Although, the polymer is a copolymer of acrylamide and acrylic acid derivatives but the cross-linking chemicals used during inverse phase polymerization may be either unsuitable for environment or substantially non-degradable or insufficiently degradable, particularly at ambient conditions.

Another concern while using additives to prepare enhanced water mixture for fire suppression purpose is the right viscosity. Generally, the viscosity of fire-fighting mixtures after adding the superabsorbent polymers is kept slightly higher than the viscosity of pure water. The right viscosity is important in order that the water for fire-fighting remains easy to handle, in particular fully pumpable. The swelling nature of the polymers promotes particle agglomeration and subsequent blockage of the nozzle or even pipes pumping out the fire-fighting mixture.

Therefore, while preparing SAP based water mixtures appropriate for fire suppression, additional substances are being added to obtain right viscosity of the enhanced water mixture. Not too low viscosity like water otherwise, enhanced water mixture will have same run-off as water and won't be available to suppress the fire. Not too high viscosity otherwise, it will face handling problem like chocking and blockage of fire-fighting equipment like hose, eductor, nozzle etc.

The addition of substances along with superabsorbent polymers which increase the viscosity of water have been described in the prior art. These include cellulose derivatives, alginates or water-soluble synthetic polymers. Use has also been made of non-flammable mineral additives to the extinguishing water, e.g. water-soluble inorganic salts or water-insoluble materials such as bentonite or attapulgite. Disadvantages associated with use of such substances include the high weight percentages of mineral additives generally required in order to achieve a sufficiently high level of thickening (e.g. 10 to 20% w/w by weight); the corrosive action of certain salts such as sulfates or chlorides; and the possibility of undesired environmental influences, such as on fertilizing agents.

The effective use of a superabsorbent polymer for fire suppression requires the use of a polymer having high water absorptivity. However, high water absorptivity leads to the resulting composition having very low viscosity, which tends to spread out very quickly, presenting disadvantages to the composition during the actual fire-fighting operation.

Apart from achieving accurate viscosity, the fire-retardant compositions based on superabsorbent polymers should be able to withstand microbial degradation as the fire-retardant compositions are prone to deteriorate when stored as well as when mixed with water during preparation of some water-based formulations and also during application.

Thus, there is a need in the art for an effective fire-retardant composition which utilizes a superabsorbent polymer having higher water absorptivity, yet which does not suffer from the extremely low viscosity of the resulting composition, is able to withstand microbial degradation upon storage and is environment friendly.

Object of the Present Invention

An objective of the present invention is to provide a fire-retardant composition appropriate for fire suppression.

Another objective of the present invention is to provide a biodegradable fire-retardant composition appropriate for fire suppression.

Another objective of the present invention is to provide a fire-retardant composition comprising superabsorbent polymers with greater water absorption capacity.

Another objective of the present invention is to provide a fire-retardant composition able to withstand microbial degradation when stored.

Another objective of the present invention is to provide a fire-retardant composition capable of spraying onto structures to control urban and wildlife fires.

Yet another objective of the present invention is to provide a fire-retardant composition capable of coating onto structures and objects to protect them from urban and wildlife fires.

Still another objective of the present invention is to provide a process of preparing fire-retardant composition appropriate for fire suppression at the point-of-use.

Yet another objective of the present invention is to provide a method of applying fire-retardant composition to suppress and extinguish fire according to the invention.

SUMMARY OF THE INVENTION

In an aspect, the present invention provides a fire-retardant composition comprising
  a superabsorbent polymer;
  a viscosity control agent; and
  an antimicrobial agent
wherein said composition when added to water creates enhanced water mixture appropriate for fire suppression.

In another aspect, the present invention provides a fire-retardant composition comprising
  a starch based superabsorbent polymer;
  a viscosity control agent; and
  an antimicrobial agent
wherein said composition when added to water creates enhanced water mixture appropriate for fire suppression.

In another aspect, the present invention provides a fire-retardant composition comprising
  0.01% to 99%, by weight, a starch based superabsorbent polymer capable of absorbing significant amounts of water relative to its weight;
  0.01% to 50%, by weight, viscosity control agent; and an
  0.001% to 5%, by weight, an antimicrobial agent
wherein said composition when added to water creates enhanced water mixture of viscosity ranging from 300-2500 cps appropriate for fire suppression.

In another aspect, the present invention provides a fire-retardant composition comprising
  0.01% to 99%, by weight, a starch based superabsorbent polymer capable of absorbing significant amounts of water relative to its weight;
  0.01% to 50%, by weight, viscosity control agent; and an
  0.005% to 5%, by weight, an antimicrobial agent
wherein said composition when added to water creates enhanced water mixture of viscosity ranging from 1500-2000 cps appropriate for fire suppression.

In another aspect, the present invention provides a fire-retardant composition comprising
  0.01% to 99%, by weight, a starch based superabsorbent polymer capable of absorbing significant amounts of water relative to its weight;
  0.01% to 50%, by weight, a viscosity control agent selected from insoluble, inorganic powders including silicon dioxide, fumed silica, precipitated silica, silicic acid, silicates, titanium dioxide, aluminum oxide, magnesium oxide, zinc oxide, talc, calcium phosphate, clays, diatomataceous earth, zeolites, bentonite, kaolin, hydrotalcite and activated clay; and
  0.005% to 5%, by weight, antimicrobial agent
wherein said composition when added to water creates enhanced water mixture of viscosity ranging from 1500-2000 cps appropriate for fire suppression.

In another aspect the present invention provides a process of preparing fire-retardant composition comprising
  a superabsorbent polymer;
  a viscosity control agent; and
  an antimicrobial agent wherein said process comprises mixing said superabsorbent polymer, viscosity control agent and an antimicrobial agent simultaneously, sequentially or separately to obtain fire-retardant composition.

In yet another aspect, the present invention provides a process of preparing fire-retardant composition comprising
  a superabsorbent polymer;
  a viscosity control agent; and
  an antimicrobial agent
wherein said process comprises mixing said superabsorbent polymer, viscosity control agent and an antimicrobial agent and wherein said composition when added to water simultaneously, sequentially or separately creates enhanced water mixture appropriate for fire suppression.

Another aspect of the present invention provides use of fire-retardant composition for preventing or extinguishing fire wherein said composition comprises a superabsorbent polymer capable of absorbing significant amounts of water relative to its weight; a viscosity control agent; and an antimicrobial agent.

Another aspect of the present invention provides a method of preventing or extinguishing fire, said method comprising mixing the composition comprising: a starch based superabsorbent polymer; a viscosity control agent; and an antimicrobial agent;
with water to create enhanced water mixture of viscosity ranging from 300-2500 cps; and directing it to a surface to prevent and/or extinguish fire.

Another aspect of the present invention provides a kit of fire-retardant composition comprising superabsorbent polymers, viscosity control agent and an antimicrobial agent; wherein kit is added to water to create enhanced water mixture at the point-of-use appropriate for fire suppression.

BRIEF DESCRIPTION OF THE DRAWINGS

It is believed that certain embodiments will be better understood from the following description taken in conjunction with the accompanying drawings in which.

DESCRIPTION OF THE INVENTION

Figure 1:
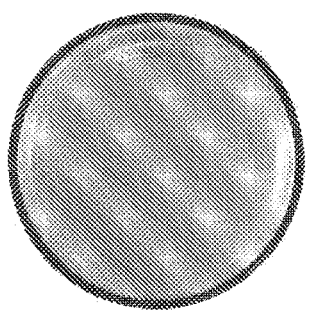
FIG. 1 pictorially illustrates bacterial growth in nutrient agar treated with a fire-retardant composition without an antimicrobial agent and with the antimicrobial agent in accordance with the present disclosure.
Figure 1:
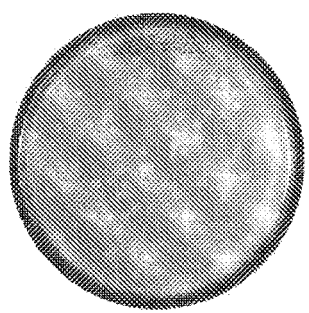
Figure 1:
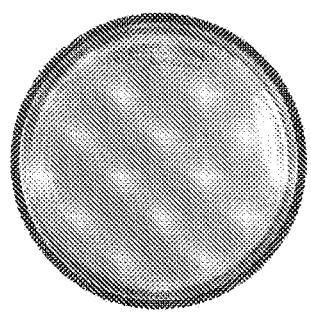

Surprisingly, inventors of the present invention found that a fire-retardant composition appropriate for fire suppression can be obtained by mixing starch based superabsorbent polymers and a viscosity control agent. The viscosity control agent prevents agglomeration of superabsorbent polymers when mixed with water. Inventors of the present invention carefully arrived at a suitable ratio of superabsorbent polymer and the viscosity control agent to obtain desired viscosity range from 300-2500 cps appropriate for fire suppression. Below 300 cps, water-additive mixture behaves like water and not found effective in suppressing the fire. Above 2500 cps, water-additive mixture become too thick as it cannot be pumped through fire hoses/pipes and also choke the educator nozzle. The addition of viscosity control agent to water-superabsorbent polymer mixture overcomes agglomeration of superabsorbent polymers when added to water and facilitate uniform dispersion of SAP in water appropriate for fire suppression within desired viscosity range. The viscosity control agent not only prevented agglomeration of starch-based SAP, but also surprisingly increased the stability of the water-superabsorbent polymer mixture.

Within the context of this specification, the terms "superabsorbent polymer" or "SAP" or "polymer gel" refer to water swellable polymers that can absorb water many times their weight in an aqueous solution. Without wishing to be bound by theory, the term superabsorbent polymers also apply to polymers that absorb water as well as de-sorb the absorbed water. The superabsorbent polymer may be selected from but not limited to water-swellable or water absorbing or water-retentive polymers such as cross-linked polymers that swell without dissolving in the presence of water, and may, absorb at least 10, 100, 1000, or more times their weight in water.

Within the context of this specification, the term "viscosity control agent" refers to a substance that aids in dispersion of superabsorbent polymers in water and provide desired viscosity to an enhanced water mixture appropriate for fire suppression. The viscosity control agent lowers down the opposite forces between superabsorbent polymers and water and facilitate quicker dispersion of superabsorbent polymers in water. At the same time, the additive forces between superabsorbent polymers and viscosity control agent help achieving desired viscosity.

Within the context of this specification, the term "fire-retardant pre-mix" refers to a composition obtained by mixing superabsorbent polymer, viscosity control agent and antimicrobial agent which is meant to be added to water to form fire-retardant composition appropriate for fire-suppression.

Within the context of this specification, the term "antimicrobial agent" refers to chemical compositions that are used to prevent microbiological contamination and deterioration of fire-retardant composition when stored in the form of fire-retardant pre-mix, when prepared as water-based formulations as well as when diluted with water while application. At a desired concentration, antimicrobial agents act as bacteriostatic, fungistatic, algistatic, sporostatic, bactericidal, fungicidal, algicidal, and sporicidal for fire-retardant composition.

Within the context of this specification, the term "enhanced water mixture" refers to a composition obtained by mixing superabsorbent polymer, viscosity control agent and antimicrobial agent in water to form fire-retardant composition appropriate for fire-suppression.

Within the context of this specification, the terms protectant and preventive are used interchangeably and refers to a coating application wherein superabsorbent polymer composition is applied onto objects or surfaces prone to catch fire.

In accordance with the present invention, there is provided a fire-retardant composition comprising superabsorbent polymers; said composition when added to water creates enhanced water mixture appropriate for fire suppression.

According to an embodiment, present invention provides a fire-retardant composition comprising a superabsorbent polymer capable of absorbing significant amounts of water relative to its weight; a viscosity control agent; and an antimicrobial agent wherein said composition when added to water creates an enhanced water mixture appropriate for fire suppression.

According to another embodiment, the superabsorbent polymer is selected from, but not limited to, copolymer of acrylamide and sodium acrylate, copolymer of acrylamide and potassium acrylate; hydrolyzed starch-polyacrylonitrile; 2-propenenitrile homopolymer, hydrolyzed, sodium salt or poly(acrylamide co-sodium acrylate) or poly(2-propenamide-co-2-propanoic acid, sodium salt); starch-g-poly(2propenamide-co-2-propanoic acid, mixed sodium and aluminium salts); starch-g-poly(2-propenamide-co-2-propanoic acid, potassium salt); poly(2-propenamide-co-2-propanoic acid, sodium salt); Starch-g-poly (propenoic acid) sodium salt, Starch-g-poly (propenoic acid) potassium salt, poly-2-propanoic acid, sodium salt; starch-g-poly(acrylonitrile) or poly(2-propenamide-co-sodium acrylate); starch/acrylonitrile copolymer; crosslinked copolymers of acrylamide and sodium acrylate; crosslinked polymers of acrylamide and sodium polyacrylate; anionic polyacrylamide; starch grafted sodium polyacrylates; acrylic acid polymers, sodium salt; crosslinked copolymers of potassium polyacrylate and polyacrylamide; sodium polyacrylate; superabsorbent polymer laminates and composites; partial sodium salt of crosslinked polypropenoic acid; potassium polyacrylate, lightly crosslinked; sodium polyacrylate, lightly crosslinked; sodium polyacrylates; poly(sodiumacrylate) homopolymer; polyacrylamide polymers, carrageenan, agar, alginic acid, guar gums and its derivatives, and gellan gum; specific superabsorbent polymers include crosslinked copolymer of acrylamide and potassium acrylate.

According to preferred embodiment of the present invention, the superabsorbent polymers are selected from starch-based superabsorbent polymer that includes a monomer graft polymerized onto a starch in the presence of an initiator to form a starch graft copolymer.

According to preferred embodiment of the present invention, the superabsorbent polymer are selected from group comprising of copolymers of hydrolyzed starch-polyacrylonitrile; 2-propenenitrile homopolymer, hydrolyzed, sodium salt or poly(acrylamide co-sodium acrylate) or poly (2-propenamide-co-2-propanoic acid, sodium salt); starch-g-poly(2propenamide-co-2-propanoic acid, mixed sodium and aluminium salts); starch-g-poly(2-propenamide-co-2-propanoic acid, potassium salt); poly(2-propenamide-co-2-propanoic acid, sodium salt); poly-2-propanoic acid, sodium salt; starch-g-poly(acrylonitrile) or poly(2-propenamide-co-sodium acrylate);

In a preferred embodiment, the superabsorbent polymer capable of absorbing significant amounts of water relative to its weight are selected from the group comprising of is starch-g-poly (2-propenamide-co-2-propenoic acid) potassium salt, starch-g-poly (2-propenamide-co-2-propenoic acid) sodium salt, starch-g-poly (propenoic acid) sodium salt, starch-g-poly (propenoic acid) potassium salt, sodium polyacrylamide and potassium polyacrylamide.

According to preferred embodiment of the present invention, the superabsorbent polymer capable of absorbing significant amounts of water relative to its weight is starch-g-poly (2-propenamide-co-2-propenoic acid) potassium salt or crosslinked polyacrylic acid potassium salt.

According to an embodiment of the present invention, the superabsorbent polymers for fire-retardant composition have a particle size that is finer than 100 mesh.

According to another embodiment of the present invention, particle size of the superabsorbent polymers capable of absorbing significant amounts of water relative to its weight is in the range from about 20 μm to about 250 μm (equivalent to 30-500 mesh). The smaller particles of the present invention allow for a shorter swell time which, in turn, allows for the particles to complete the swell during the time the fire-retardant composition is applied for the purpose of fire-fighting.

In a preferred embodiment of the present invention, particle size of the of the superabsorbent polymers capable of absorbing significant amounts of water relative to its weight is in the range from about 90 μm to about 150 μm.

According to another embodiment of the present invention, superabsorbent polymer capable of absorbing significant amounts of water relative to its weight comprises from about 0.1% w/w to about 99% w/w and preferably from about 1% w/w to about 95% w/w of superabsorbent polymer of the total weight of the composition.

In a preferred embodiment of the present invention superabsorbent polymers capable of absorbing significant amounts of water relative to its weight comprises from about 1% w/w to about 90% w/w of superabsorbent polymer of total weight of the composition.

According to an embodiment of the present invention superabsorbent polymers capable of absorbing significant amounts of water relative to its weight has the water absorption capacity from about 10 times to about 1000 times its weight.

In a preferred embodiment of the present invention superabsorbent polymers capable of absorbing significant amounts of water relative to its weight has the water absorption capacity from about 300 times to about 1000 times its weight.

In a preferred embodiment of the present invention superabsorbent polymers capable of absorbing significant amounts of water relative to its weight has the water absorption capacity from about 500 times to about 800 times its weight.

According to an embodiment of the present invention superabsorbent polymers are in the form of powder and granules.

According to preferred embodiment of the present invention superabsorbent polymers are in the form of powder.

According to an embodiment of the present invention superabsorbent polymers of the fire-retardant composition are biodegradable.

According to an embodiment of the present invention starch based superabsorbent polymers of the fire-retardant composition are biodegradable.

According to another embodiment of the present invention, the fire-retardant composition comprises of a viscosity control agent.

According to another embodiment, the viscosity control agent is a water-insoluble inorganic powder selected from, but not limited to, amorphous silica, silicon dioxide, silicic acid, silicates, titanium dioxide, aluminium oxide, magnesium oxide, zinc oxide, talc, calcium phosphate, clays, diatomataceous earth, zeolites, bentonite, kaolin, hydrotalcite, activated clays, etc. The insoluble inorganic powder viscosity control agents may be a single compound or a mixture of compounds selected from the above list.

In a preferred embodiment, the viscosity control agent as insoluble inorganic powder is amorphous silica in the form of precipitated silica or fumed silica.

In a preferred embodiment, the viscosity control agent as insoluble inorganic powder is precipitated silica.

In a preferred embodiment, the viscosity control agent as insoluble inorganic powder is fumed silica.

In a preferred embodiment, the viscosity control agent as insoluble inorganic powder is zeolite. According to an embodiment, the viscosity control agent is capable of preventing agglomeration of superabsorbent polymers in the enhanced water mixture appropriate for fire suppression.

According to another embodiment of the present invention, the viscosity control agent comprises from about 0.01% w/w to about 50% w/w and preferably from about 0.1% w/w to about 35% w/w of viscosity control agent of the total weight of the composition.

In a preferred embodiment of the present invention, the viscosity control agent comprises from about 1% w/w to about 30% w/w viscosity control agent of the total weight of the composition.

According to another embodiment of the present invention, a preferred particle diameter of the inorganic powder is 1,000 μm or smaller, and more preferably from about 7 μm to about 20 μm.

According to another embodiment of the present invention, the fire-retardant composition comprises of an antimicrobial agent.

According to another embodiment of the present invention, the antimicrobial agent prevents microbial growth in the fire-retardant composition pre-mix.

According to another embodiment of the present invention, the antimicrobial agents prevents microbial growth in the enhanced water mixture obtained by mixing fire-retardant composition pre-mix with water.

According to another embodiment of the present invention, the antimicrobial agents prevents microbial growth when fire-retardant composition is formulated as water-based fire-retardant composition.

According to another embodiment of the present invention, the antimicrobial agent is selected from the group comprising of bronopol ((2-bromo-2-nitropropane-1,3-diol) and a mixture of 5 Chloro-2-Methyl-4-isothiazolin-3-one and 0.52% 2-Methyl-4-isothiazolin-3-one ((Mergal K14 or CMIT/MIT or Isocil)), 1,2-benzisothiazolin-3-one (Proxel GXL), Nisin, Natamycin and the like.

According to another embodiment of the present invention, the antimicrobial agent comprises from about 0.001% w/w to about 10% w/w and preferably from about 0.001% w/w to about 5% w/w of antimicrobial agent of the total weight of the composition.

In a preferred embodiment of the present invention, the antimicrobial agent comprises from about 0.001% w/w to about 2% w/w antimicrobial agent of the total weight of the composition.

In an embodiment of the present invention, the antimicrobial agents effectively control the growth of microbes (bacteria and fungi) when the composition comprising a superabsorbent polymer capable of absorbing significant amounts of water relative to its weight; a viscosity control agent; and an antimicrobial agent is added to water to create enhanced water mixture appropriate for fire suppression.

In an embodiment of the present invention, the antimicrobial agents effectively control the growth of fungus when the composition comprising a superabsorbent polymer capable of absorbing significant amounts of water relative to its weight; a viscosity control agent; and an antimicrobial agent is added to water to create enhanced water mixture appropriate for fire suppression.

According to an embodiment of the present invention, a fire-retardant composition comprising: a superabsorbent polymer; a viscosity control agent; and an antimicrobial agent is added to water having hardness ranging from about 17 ppm to about 2000 ppm to create enhanced water mixture appropriate for fire suppression.

According to an embodiment of the present invention, a fire-retardant composition comprising: a superabsorbent polymer; a viscosity control agent; and an antimicrobial agent is added to water having hardness ranging from about 17 ppm to about 1300 ppm to create enhanced water mixture appropriate for fire suppression.

According to an embodiment of the present invention, a fire-retardant composition comprising: a superabsorbent polymer; a viscosity control agent; and an antimicrobial agent is added to water having hardness ranging from about 17 ppm to about 200 ppm to create enhanced water mixture appropriate for fire suppression.

According to an embodiment of the present invention, a fire-retardant composition comprising: a superabsorbent polymer; a viscosity control agent; and an antimicrobial agent is formulated as wet concentrate or gel or slurry by mixing fire-retardant composition pre-mix to water having hardness ranging from about 17 ppm to about 90 ppm to create enhanced water mixture appropriate for fire suppression.

The degree of hardness of the water, in other words the number of cations in the water, affects the degree of swelling of the polymer capable of absorbing significant amounts of water relative to its weight. A component may also be introduced to counteract this effect. It will be obvious to one skilled in the art that the amount of the component in the composition may be varied depending on the hardness of the water in the particular region of use. Also, the fire-retardant composition is effective without inclusion of a chemical to counteract the water hardness, particularly in those regions of the country that do not experience hard water.

According to an embodiment of the present invention, a fire-retardant composition comprising
  0.01% to 99%, by weight, a starch based superabsorbent polymer capable of absorbing significant amounts of water relative to its weight;
  0.01% to 50%, by weight, viscosity control agent; and an
  0.001% to 5%, by weight, an antimicrobial agent
wherein said composition when added to water creates enhanced water mixture of viscosity ranging from 300-2500 cps appropriate for fire suppression.

According to another embodiment of the present invention, a fire-retardant composition comprising
  0.01% to 99%, by weight, a starch based superabsorbent polymer capable of absorbing significant amounts of water relative to its weight;
  0.01% to 50%, by weight, viscosity control agent; and an
  0.005% to 5%, by weight, an antimicrobial agent
wherein said composition when added to water creates enhanced water mixture of viscosity ranging from 1500-2000 cps appropriate for fire suppression.

According to an embodiment of the present invention, the fire-retardant composition obtained by mixing superabsorbent polymer capable of absorbing significant amounts of water relative to its weight, antimicrobial agent and viscosity control agent according to the invention has the viscosity from about 300 cps to about 2500 cps.

In a preferred embodiment of the present invention, the fire-retardant composition obtained by mixing superabsorbent polymer capable of absorbing significant amounts of water relative to its weight, antimicrobial agent and viscosity control agent according to the invention has the viscosity from about 1500 cps to about 2000 cps.

Further the present invention provides a process for preparing fire-retardant composition.

According to an embodiment of the present invention, a process of preparing fire-retardant composition comprising
  a superabsorbent polymer;
  a viscosity control agent; and
  an antimicrobial agent;

wherein said process comprises mixing said superabsorbent polymer, viscosity control agent and an antimicrobial agent simultaneously, sequentially or separately to obtain fire-retardant composition.

According to an embodiment of the present invention, a process of preparing fire-retardant composition comprising
   a superabsorbent polymer;
   a viscosity control agent; and
   an antimicrobial agent
wherein said process comprises mixing said superabsorbent polymer, viscosity control agent and an antimicrobial agent to obtain fire-retardant composition pre-mix.

According to an embodiment of the present invention, a process of preparing fire-retardant composition comprising
   a starch based superabsorbent polymer;
   a viscosity control agent; and
   an antimicrobial agent
wherein said process comprises mixing said starch based superabsorbent polymer, viscosity control agent and an antimicrobial agent to obtain fire-retardant composition pre-mix.

According to an embodiment of the present invention the process of preparing fire-retardant composition further comprises of mixing the fire-retardant composition with water to create enhanced water mixture appropriate for fire suppression.

According to an embodiment of the present invention, a process of preparing fire-retardant composition comprising
   a superabsorbent polymer;
   a viscosity control agent; and
   an antimicrobial agent
wherein said process comprises mixing said superabsorbent polymer, viscosity control agent and an antimicrobial agent and wherein said composition when added to water simultaneously, sequentially or separately creates enhanced water mixture appropriate for fire suppression.

According to an embodiment of the present invention, a process of preparing fire-retardant composition comprising
   a superabsorbent polymer;
   a viscosity control agent; and
   an antimicrobial agent
wherein said process comprises mixing said superabsorbent polymer, viscosity control agent and an antimicrobial agent simultaneously, sequentially or separately with water creates enhanced water mixture of viscosity ranging from 300-2500 cps appropriate for fire suppression.

According to another embodiment of the present invention, a process of preparing fire-retardant composition comprising a superabsorbent polymer; a viscosity control agent; and an antimicrobial agent; said process comprises:
   (1) mixing superabsorbent polymer and viscosity control agent in a homogenization vessel and homogenize it to obtain mixture;
   (2) adding antimicrobial agent to the mixture of step (1) and continue homogenizing the mixture to obtain fire-retardant composition pre-mix;
   (3) adding fire-retardant composition pre-mix of step (2) to the sufficient amount of water under continuous stirring to obtain fire-retardant composition.

According to another embodiment of the present invention, a process of preparing fire-retardant composition comprising a superabsorbent polymer; a viscosity control agent; and an antimicrobial agent; said process comprises:
   (1) mixing superabsorbent polymer and viscosity control agent in a homogenization vessel and homogenize it to obtain mixture;
   (2) adding antimicrobial agent to the mixture of step (1) and continue homogenizing the mixture to obtain fire-retardant composition pre-mix;
   (3) adding fire-retardant composition pre-mix of step (2) to the sufficient amount of water under continuous stirring to obtain fire-retardant composition wherein step (3) is performed at the time of application.

According to another embodiment of the present invention, a process of preparing fire-retardant composition comprises:
   (1) mixing starch-g-poly (2-propenamide-co-2-propenoic acid) potassium salt and amorphous silica in a homogenization vessel and homogenize it to obtain mixture;
   (2) adding bronopol to the mixture of step (1) and continue homogenizing the mixture;
   (3) adding the mixture of step (2) to the sufficient amount of water under continuous stirring to obtain fire-retardant composition.

According to another embodiment of the present invention, a process of preparing fire-retardant composition comprises:
   (1) mixing 82 g starch-g-poly (2-propenamide-co-2-propenoic acid) potassium salt and 16 g amorphous silica in a homogenization vessel and homogenize it to obtain mixture;
   (2) adding 2 g bronopol to the mixture of step (1) and continue homogenizing the mixture to obtain fire-retardant composition pre-mix;
   (3) adding 0.5 g fire-retardant composition pre-mix of step (2) to 99.5 g water under continuous stirring to obtain fire-retardant composition.

According to an embodiment of the present invention, the fire-retardant composition may further comprise substances with flame retardants, emulsifying agent, additives, coloring agents, opacifying agents, dyes, extenders and the like in order to increase the stability and efficiency of the composition according to the present invention.

According to an embodiment of the present invention, a fire-retardant composition comprises from about 0.01% w/w to 99% w/w, a superabsorbent polymer capable of absorbing significant amounts of water relative to its weight; from about 0.01% w/w to about 50% w/w viscosity control agent; and from about 0.001% w/w to about 5% w/w an antimicrobial agent wherein said fire-retardant composition when added to water creates enhanced water mixture of viscosity ranging from 300-2500 cps appropriate for fire suppression.

According to specific embodiment, a fire-retardant composition of the present invention comprising, from about 0.01% w/w to 99% w/w starch-g-poly (2-propenamide-co-2-propenoic acid) potassium salt; from about 0.01% w/w to about 50% w/w fumed silica; and from about 0.001% w/w to about 5% w/w bronopol wherein said composition when added to water creates enhanced water mixture of viscosity ranging from 300-2500 cps appropriate for fire suppression.

According to specific embodiment, a fire-retardant composition of the present invention comprising, from about 0.01% w/w to 99% w/w starch-g-poly (2-propenamide-co-2-propenoic acid) potassium salt; from about 0.01% w/w to about 50% w/w precipitated silica; and from about 0.001% w/w to about 5% w/w Mergal K 14 wherein said composition when added to water creates enhanced water mixture of viscosity ranging from 300-2500 cps appropriate for fire suppression.

According to an embodiment of the present invention, use of fire-retardant composition for preventing or extinguishing fire wherein said composition comprises superabsorbent polymers capable of absorbing significant amounts of water relative to its weight; a viscosity control; and an antimicrobial agent.

According to an embodiment of the present invention, the fire-retardant composition is formulated as pre-mix powder comprising superabsorbent polymer, viscosity control agent and antimicrobial agent wherein said composition is added to water before use to create enhanced water mixture appropriate for fire suppression.

According to an embodiment of the present invention, the fire-retardant composition is formulated as concentrate or gel by mixing superabsorbent polymer, viscosity control agent and antimicrobial agent in an aqueous medium concentrate or gel; and said concentrate or gel may be further mixed with sufficient quantity of water to create an enhanced water mixture appropriate for fire suppression.

According to another embodiment of the present invention, the fire-retardant composition has a suppressant and protectant action.

According to an embodiment of the present invention, the fire-retardant composition acts as suppressant when sprinkle or sprayed on burning objects to douse the fire.

According to an embodiment of the present invention, the fire-retardant composition acts as protectant when coated onto objects and surfaces prone to catch fire.

According to an embodiment of the present invention, a method of preventing or extinguishing fire, said method comprising mixing fire-retardant composition comprising superabsorbent polymers, viscosity control agent and an antimicrobial agent; with water to create enhanced water mixture of viscosity ranging from 300-2500 cps; and directing it to a surface to prevent and/or extinguish a fire.

According to an embodiment of the present invention, a method of preventing or extinguishing fire, said method comprising mixing fire-retardant composition comprising superabsorbent polymers, viscosity control agent and an antimicrobial agent; with water to create enhanced water mixture of viscosity ranging from 300-2500 cps; and coating the objects and surface prone to catch fire.

According to another embodiment of the present invention, the method of preventing or extinguishing fire comprises applying the said fire-retardant composition by sprinkling or spraying onto the burning objects and surfaces.

According to another embodiment of the present invention, the method of preventing or extinguishing fire comprises mixing the superabsorbent polymer capable of absorbing significant amounts of water relative to its weight, viscosity control agent and antimicrobial agent into a standard fire extinguishing canisters and water tanks and mixing it with water under continuous stirring to obtain the fire-retardant composition.

According to another embodiment of the present invention, the method of preventing or extinguishing fire comprises mixing the superabsorbent polymer capable of absorbing significant amounts of water relative to its weight, viscosity control agent, antimicrobial agent and water in a standard cylindrical fire extinguisher vessel and applying it onto objects to prevent and/or extinguish fire.

According to another embodiment of the present invention, the method of preventing or extinguishing fire comprises mixing the superabsorbent polymer capable of absorbing significant amounts of water relative to its weight, viscosity control agent and antimicrobial agent water in a standard cylindrical fire extinguisher vessel and contacting it with water externally using eductor nozzle allowing instant mixing of a mixture of superabsorbent polymers, viscosity agent and antimicrobial agent with water and applying it onto objects to prevent and/or extinguish fire.

According to an embodiment of the present invention, fire-retardant composition may be coated onto horizontally as well as vertically mounted objects and/or surfaces.

According to an embodiment of the present invention, fire-retardant composition of suitable viscosity with sufficient thickness may be prepared to coat vertically mounted objects and/or surfaces.

According to an embodiment of the present invention, fire-retardant composition comprising starch based superabsorbent polymer, viscosity control agent and antimicrobial agent is safer to the environment during thermal decomposition.

According to an embodiment of the present invention, fire-retardant composition comprising starch based superabsorbent polymer, viscosity control agent and antimicrobial agent does not emit toxic gases during thermal decomposition.

According to an embodiment of the present invention, a kit of fire-retardant composition comprising superabsorbent polymers, viscosity control agent and an antimicrobial agent; wherein said kit when added to water to create enhanced water mixture at the point-of-use appropriate for fire suppression.

According to an embodiment of the present invention, a kit for fire-retardant composition capable of extinguishing/suppressing the fire according to the present invention wherein, kit comprising in separate packings, the superabsorbent polymer capable of absorbing significant amounts of water relative to its weight mixed with an antimicrobial agent in a first pack and the viscosity control agent in a second pack such that composition is prepared by adding components of both the packs of the kit in desired amount of water and mixing it vigorously to obtain fire-retardant composition.

According to an embodiment of the present invention, a kit for fire-retardant composition capable of extinguishing/suppressing the fire according to the present invention wherein, kit comprising in separate packings, the superabsorbent polymer capable of absorbing significant amounts of water relative to its weight mixed with an antimicrobial agent in a first pack and the viscosity control agent in the second pack such that composition is prepared by adding components of both the packs of the kit in desired amount of water and mixing it vigorously to obtain composition of viscosity ranging from about 300 cps to about 2500 cps.

It will be understood that the specification and examples are illustrative but not limitative of the present invention and that other embodiments within the spirit and scope of the invention will suggest themselves to those skilled in the art.

The following examples illustrate the invention, but by no means intend to limit the scope of the claims.

EXAMPLE

Example 1: Fire-Retardant Composition of 1700-2000 Cps Viscosity

|  | Ingredient | Quantity |
|---|---|---|
| Fire-retardant composition pre-mix | Starch-g-poly (2-propenamide-co-2-propenoic acid) potassium salt | 82 g |
|  | Precipitated Silica | 16 g |
|  | 2-bromo-2-nitro-1,3-propanediol (Bronopol) | 2 g |
|  | Water Enhancer Mixture |  |
|  | Fire retardant composition pre-mix | 0.5 g |
|  | Water (approx. 70 ppm hardness) | 99.5 g |
|  | Total | 100 |

Preparation of fire-retardant composition:

I. Preparation of Fire-retardant composition pre-mix:
   a) mixing 82 g starch-g-poly (2-propenamide-co-2-propenoic acid) potassium salt, 16 g precipitated silica and 2 g of 2-bromo-2-nitro-1,3-propanediol to obtain 100 g pre-mix;

II. Preparation of water enhancer mixture:
   a) adding 0.5 g pre-mix to 99.5 g water under continuous stirring to obtain water enhancer mixture;
   b) agitating the water enhancer mixture for 2-3 minutes to obtain fire-retardant composition of 1700-2000 cps viscosity (@60 rpm, spindle-63 in Brookfield viscometer).

Example 2: Fire-Retardant Composition of 1600-1800 Cps Viscosity

| | Ingredient | Quantity |
|---|---|---|
| Fire-retardant composition pre-mix | Starch-g-poly (2-propenamide-co-2-propenoic acid) potassium salt | 81.3 g |
| | Precipitated Silica | 16.7 g |
| | 2-bromo-2-nitro-1,3-propanediol (Bronopol) | 2 g |
| Water Enhancer Mixture | | |
| | Fire retardant composition pre-mix | 0.5 g |
| | Water (approx. 70 ppm hardness) | 99.5 g |
| | Total | 100 |

The fire-retardant composition is prepared by mixing starch-g-poly (2-propenamide-co-2-propenoic acid) potassium salt, precipitated silica, bronopol and water are mixed in a given ratio shown above and prepared as per the process of Example 1.

Example 3: Fire-Retardant Composition of 1400-1700 Cps Viscosity

| | Ingredient | Quantity |
|---|---|---|
| Fire-retardant composition pre-mix | Starch-g-poly (2-propenamide-co-2-propenoic acid) potassium salt | 87.5 g |
| | Zeolite | 11 g |
| | 2-bromo-2-nitro-1,3-propanediol (Bronopol) | 1.5 g |
| Water Enhancer Mixture | | |
| | Fire retardant composition pre-mix | 0.5 g |
| | Water (approx. 70 ppm hardness) | 99.5 g |
| | Total | 100 |

The fire-retardant composition is prepared by mixing starch-g-poly (2-propenamide-co-2-propenoic acid) potassium salt, zeolite, bronopol and water in a given ratio shown above and prepared as per the process of Example 1.

Example 4: Fire-Retardant Composition of 800-1100 Cps Viscosity

| | Ingredient | Quantity |
|---|---|---|
| Fire-retardant composition pre-mix | Polyacrylamide | 87.5 g |
| | Fumed Silica | 11 g |
| | 2-bromo-2-nitro-1,3-propanediol (Bronopol) | 1.5 g |
| Water Enhancer Mixture | | |
| | Fire retardant composition pre-mix | 0.5 g |
| | Water (70-150 ppm hardness) | 99.5 g |
| | Total | 100 |

The fire-retardant composition is prepared by mixing polyacrylamide, fumed silica, bronopol and water in a given ratio shown above and prepared as per the process of Example 1.

Example 5: Fire-Retardant Composition of 1200-1500 Cps Viscosity

| | Ingredient | Quantity |
|---|---|---|
| Fire-retardant composition pre-mix | Starch-g-poly (2-propenamide-co-2-propenoic acid) potassium salt | 87.5 g |
| | Fumed silica | 10.5 g |
| | 2-bromo-2-nitro-1,3-propanediol (Bronopol) | 2 g |
| Water Enhancer Mixture | | |
| | Fire retardant composition pre-mix | 0.5 g |
| | Water (70 ppm hardness) | 99.5 g |
| | Total | 100 |

The fire-retardant composition with starch-g-poly (2-propenamide-co-2-propenoic acid) potassium salt, bronopol and water are mixed in a given ratio shown above and prepared as per the process of Example 1.

Example 6: Fire-Retardant Composition of 1400-1700 Cps Viscosity

| | Ingredient | Quantity |
|---|---|---|
| Fire-retardant composition pre-mix | Starch-g-poly (2-propenamide-co-2-propenoic acid) sodium salt | 82 g |
| | Precipitated silica | 16 g |
| | 2-bromo-2-nitro-1,3-propanediol (Bronopol) | 2 g |
| Water Enhancer Mixture | | |
| | Fire retardant composition pre-mix | 0.4 g |
| | Water (70 ppm hardness) | 99.6 g |
| | Total | 100 |

The fire-retardant composition is prepared by mixing starch-g-poly(2-propenamide-co-2-propanoic acid, sodium salt, precipitated silica, bronopol and water in a given ratio shown above and prepared as per the process of Example 1.

Example 7: Fire-Retardant Composition of 1600-1800 Cps Viscosity

| | Ingredient | Quantity |
|---|---|---|
| Fire-retardant composition pre-mix | Starch-g-poly (2-propenamide-co-2-propenoic acid) sodium salt | 87.5 g |
| | Precipitated silica | 11 g |
| | 2-bromo-2-nitro-1,3-propanediol (Bronopol) | 1.5 g |
| | Water Enhancer Mixture | |
| | Fire retardant composition pre-mix | 0.5 g |
| | Water (250 ppm hardness) | 99.5 g |
| | Total | 100 |

The fire-retardant composition is prepared by mixing starch-g-poly (2-propenamide-co-2-propenoic acid) sodium salt, precipitated silica, bronopol and water in a given ratio shown above as per the process of Example 1.

Example 8: Fire-Retardant Composition of 1300-1500 Cps Viscosity

| | Ingredient | Quantity |
|---|---|---|
| Fire-retardant composition pre-mix | Polyacrylamide polymer | 85.5 g |
| | Fumed silica | 13 g |
| | Formulated isothiazolinone (Mergal K-14) | 1.5 g |
| | Water Enhancer Mixture | |
| | Fire retardant composition pre-mix | 0.5 g |
| | Water (approx. 250 ppm hardness) | 99.5 g |
| | Total | 100 |

The fire-retardant composition is prepared by mixing polyacrylamide polymer, fumed silica, Mergal k-14 and water in a given ratio shown above as per the process of Example 1.

Example 9: Fire-Retardant Composition of 1700-2000 Cps Viscosity

| | Ingredient | Quantity |
|---|---|---|
| Fire-retardant composition pre-mix | Starch-g-poly (2-propenamide-co-2-propenoic acid) potassium salt | 83.6 g |
| | Precipitated Silica | 16 g |
| | 1,2-benzisothiazolin-3-one (Proxel GXL) | 0.4 g |
| | Water Enhancer Mixture | |
| | Fire retardant composition pre-mix | 0.5 g |
| | Water (70-150 ppm hardness) | 99.5 g |
| | Total | 100 |

The fire-retardant composition is prepared by mixing starch-g-poly (2-propenamide-co-2-propenoic acid) potassium salt, precipitated silica, proxel GXL and water in a given ratio shown above as per the process of Example 1.

Example 10: Fire-Retardant Composition of 1700-2000 Cps Viscosity

| | Ingredient | Quantity |
|---|---|---|
| Fire-retardant composition pre-mix | Starch-g-poly propenoic acid) potassium salt | 83.6 g |
| | Precipitated Silica | 16 g |
| | 1,2-benzisothiazolin-3-one (Proxel GXE) | 0.4 g |
| | Water Enhancer Mixture | |
| | Fire retardant composition pre-mix | 0.5 g |
| | Water (70-150 ppm hardness) | 99.5 g |
| | Total | 100 |

The fire-retardant composition is prepared by mixing Starch-g-poly propenoic acid) potassium salt, precipitated silica, proxel gxl and water in a given ratio shown above as per the process of Example 1.

Example 11: Fire-Retardant Composition of 1700-1900 Cps Viscosity

| | Ingredient | Quantity |
|---|---|---|
| Fire-retardant composition pre-mix | Starch-g-poly propenoic acid) Sodium salt | 82.6 g |
| | Precipitated Silica | 17 g |
| | 1,2-benzisothiazolin-3-one (Proxel GXL) | 0.4 g |
| | Water Enhancer Mixture | |
| | Fire retardant composition pre-mix | 0.5 g |
| | Water (70-150 ppm hardness) | 99.5 g |
| | Total | 100 |

The fire-retardant composition is prepared by mixing Starch-g-poly propenoic acid) sodium salt, precipitated silica, proxel gxl and water in a given ratio shown above as per the process of Example 1.

Example 12: Fire-Retardant Composition of 1600-1800 Cps Viscosity

| | Ingredient | Quantity |
|---|---|---|
| Fire-retardant composition pre-mix | Starch-g-poly propenoic acid) Sodium salt | 82 g |
| | Precipitated Silica | 16 g |
| | Bronopol | 2 g |
| | Water Enhancer Mixture | |
| | Fire retardant composition pre-mix | 0.5 g |
| | Water (70-150 ppm hardness) | 99.5 g |
| | Total | 100 |

The fire-retardant composition is prepared by mixing Starch-g-poly propenoic acid) sodium salt, precipitated silica, bronopol and water in a given ratio shown above as per the process of Example 1.

Example 13: Fire-Retardant Composition of 2400-2600 Cps Viscosity (Comparative Example)

| | Ingredient | Quantity |
|---|---|---|
| Fire-retardant composition pre-mix | Starch-g-poly (2-propenamide-co-2-propenoic acid) potassium salt | 98 g |
| | 2-bromo-2-nitro-1,3-propanediol (Bronopol) | 2 g |
| Water Enhancer Mixture | | |
| | Fire retardant composition pre-mix | 0.5 g |
| | Water (approx. 70 ppm hardness) | 99.5 g |
| | Total | 100 |

The fire-retardant composition is prepared by mixing starch-g-poly (2-propenamide-co-2-propenoic acid) potassium salt, bronopol and water are mixed in a given ratio shown above and prepared as per the process of Example 1.

Example 14: Fire-Retardant Composition 2300-2600 Cps (Comparative Example)

| | Ingredient | Quantity |
|---|---|---|
| Fire-retardant composition pre-mix | Starch-g-poly (2-propenamide-co-2-propenoic acid) potassium salt | 98.5 g |
| | 2-bromo-2-nitro-1,3-propanediol (Bronopol) | 1.5 g |
| Water Enhancer Mixture | | |
| | Fire retardant composition pre-mix | 0.5 g |
| | Water (approx. 70 ppm hardness) | 99.5 g |
| | Total | 100 |

The fire-retardant composition is prepared by mixing starch-g-poly (2-propenamide-co-2-propenoic acid) potassium salt and bronopol and water in a given ratio shown above as per the process of Example 1.

Example 15

Comparative Study to Evaluate the Role of Viscosity Control Agent

Study was conducted to evaluate the role of viscosity control agent in the fire-retardant composition. Compositions of Example-1 and Example-2 were compared against compositions of Example-12 and Example-13 which were prepared without adding viscosity control agent to the fire-retardant compositions and evaluated further. Viscosity measurement was done in brookfield viscometer at 60 rpm, spindle 63. It was found that sample prepared without viscosity control agent took around 30 minutes to mix in the water. Even after 30 min, the composition so obtained was not uniform and appeared to contain agglomerates within the enhanced water mixture. On the contrary, the sample prepared according to Example-1 and Example-2 required only 2-3 minute time to disperse fire-retardant composition pre-mix in water. We observed a bloom when pre-mix compositions of Example-1 and Example-2 were allowed to be mixed in water to obtain water enhancer mixture. This suggested that viscosity control agent is responsible for efficient dispersion of a superabsorbent polymer capable of absorbing significant amounts of water relative to its weight to ultimately prepare composition (Table-1).

TABLE 1

| | Example-1 (with viscosity control agent) Quantity (%) | Example-2 (with viscosity control agent) Quantity (%) | Example-13 (without viscosity control agent) Quantity (%) | Example-14 (without viscosity control agent) Quantity (%) |
|---|---|---|---|---|
| starch-g-poly(2-propenamide-co-2-propenoic acid) potassium salt | 82 | 81.3 | 98 | 98.5 |
| Precipitated Silica | 16 | 16.7 | 0 | 0 |
| Bronopol | 2 | 2 | 2 | 1.5 |
| Fire-retardant composition pre-mix | | | 0.5 | 0.5 |
| Water | | | 99.5 | 99.5 |
| Total | 100 g | 100 g | 100 g | 100 g |
| Observation | Uniform dispersion by gentle mixing obtained in 2-3 min. | Uniform dispersion by gentle mixing obtained in 2-3 min. | Non-uniform dispersion with agglomerates of superabsorbent polymer even after 30 min of mixing. | Non-uniform dispersion with agglomerates of superabsorbent polymer even after 30 min of mixing. |

Example 16

Study of Fire Suppressant Effectiveness of Fire-Retardant Composition in Water with Different Hardness Level Fire retardant composition of Example-1 was taken to study its effectiveness in water with different hardness levels measured as TDS (Total Dissolved Solid). Purpose behind this study was to evaluate performance of the fire-retardant composition in water with various hardness levels as water from sources like tap, pond, river, stream etc. has different hardness levels. Higher hardness indicates large amounts of dissolved solids in water. Two dispersion with 0.5% w/w and 1% w/w was prepared using composition of Example-1. Water with TDS level 190 ppm and 1230 ppm was reconstituted and prepared for testing. Water with 190 ppm hardness was used in preparing enhanced water mixture with 0.5% w/w dispersion; and water with 1230 ppm hardness was used in preparing enhanced water mixture with 1% w/w dispersion. Plain water without fire-retardant composition was also taken as standard. It was found that fire-retardant composition of Example-1 douse the fire effectively when mixed with water of 190 ppm hardness and of 1230 ppm hardness respectively. At both the hardness level, viscosity of the fire-retardant composition maintained within the effective range of 1500-2000 cps. At both the hardness level, fire retardant composition found to be more effective than water. Results are summarized in Table 2.

TABLE 2

| Parameters | Tap Water as extinguishing medium | 0.5% Composition of Example-1 as extinguishing medium | 1.0% Composition of Example-1 as extinguishing medium |
|---|---|---|---|
| Wood moisture (%) | 11.4 | 13.5 | 12.2 |
| Water TDS | 190 | 190 | 1230 |
| Total pressurised Liquid wt. (kg) | 6 | 6 | 6 |
| Fire extinguishing time (seconds) | 60 | 15 | 7 |
| Reignition after dousing (seconds) | 66 | No reignition | No reignition |
| Visual Observation | High smoke | Very less smoke | Very less smoke |

Example 17

Storage Stability of the Composition

Figure 2:
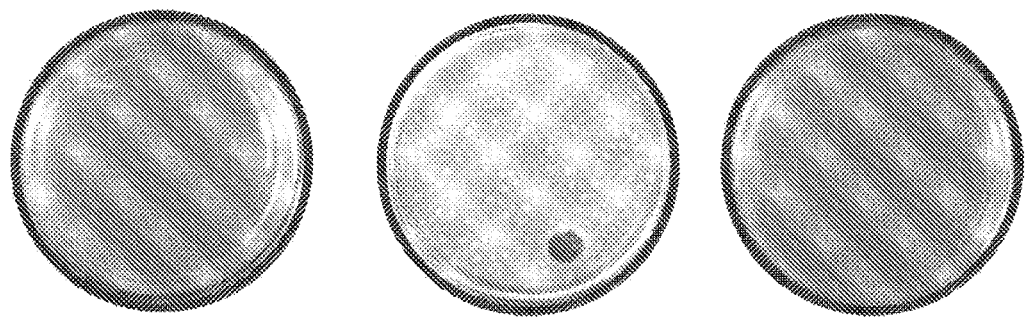
FIG. 2 pictorially illustrates fungal growth in potato dextrose agar treated with a fire-retardant composition without an antimicrobial agent and with the antimicrobial agent in accordance with the present disclosure.

The fire-retardant composition of Example-1 developed according to the present invention was subjected to microbiological studies to assess the effectiveness of antimicrobial agent against undesirable bacterial and fungal growth. The testing was performed by Pour Plate method on Nutrient Agar (NA) for the growth of bacteria and Potato Dextrose Agar (PDA) for the growth of fungi. Bacterial and fungal strains were diluted appropriately and 1 ml of diluted strain was added to respective sterilized molten but cooled agar media. After incubation the control and test plates were taken to observe microbial growth. Results are presented in Table (3 & 4) and FIGS. 1 & 2. Bacterial CFU count in composition without microbial agent was found to be 26.6× $10^2$ CFU per mL. Fungal CFU count in composition with microbial agent was found to be 13.0 CFU per mL. No bacterial or fungal growth was observed in samples where fire-retardant composition comprises of antimicrobial agent.

TABLE 3

| | | Observations | |
|---|---|---|---|
| z# | Experimental set | after 24 h | after 72 h |
| 1 | Control NA plates inoculated with sterile water | No growth | No growth |
| 2 | NA plates inoculated with composition without antimicrobial agent | Bacterial growth | Bacterial growth |
| 3 | NA plates inoculated with composition with antimicrobial agent | No growth | No growth |

TABLE 4

| # | Experimental set | Observations after 6 days |
|---|---|---|
| 1 | Control PDA plates inoculated with sterile water | No growth |
| 2 | PDA plates inoculated with composition without antimicrobial agent | fungal colony growth with appearance of bacterial growth |
| 3 | PDA plates inoculated with composition with antimicrobial agent | No growth |

Example 18

Study of Fire Extinguishing Performance

I. Fire Extinguishing Test

Efficiency of the fire-retardant composition was tested against Class A fire following IS 15683:2018 specifications using composition of Example-1. Two fire extinguishers, each with six litre volume were taken, one was filled with water and another was filled with enhanced water mixture prepared using 0.5% w/w composition of Example-1; and both the extinguishers were pressurized with nitrogen. Two wooden cribs with Type 1A type were allowed to burn up to 50% of its initial weight and then the pressurized fire extinguishers loaded with water and fire-retardant composition were used to extinguish fires of respective cribs. It was found that fire-extinguisher loaded with 0.5% fire-retardant composition doused the fire within 15 second without re-ignition for 1 hour indicating the fire was completely doused. Whereas, extinguisher with water took 60 sec to douche the fire and reignition noticed after 66 seconds. Therefore, fire-retardant composition found to be four times more effective in comparison to water. Results are summarized in Table 5.

TABLE 5

| Parameters | Water as Extinguishing medium | 0.5% Composition according to the invention as extinguishing medium |
|---|---|---|
| Wood moisture (%) | 11.4 | 13.5 |
| Water TDS (ppm) | 190 | 190 |
| Total pressurised Liquid wt. (kg) | 6 | 6 |

TABLE 5

| Parameter | Control (without water) | Control (with water) | 0.5% Gel Exp 1 composition |
|---|---|---|---|
| Plywood Dimension (mm) | 100 × 100 × 12 | 100 × 100 × 12 | 100 × 100 × 12 |
| Wood moisture (%) | 8 | 8 | 8 |
| Radiant Heat kW | 40 | 40 | 40 |
| Material ignition time (s) | 20 | 27 | 132 |

TABLE 5-continued

| Parameters | Water as Extinguishing medium | 0.5% Composition according to the invention as extinguishing medium |
|---|---|---|
| Fire extinguishing time (seconds) | 60 | 15 |
| Reignition after Fire dousing (seconds) | 66 | No reignition |
| Suppressant efficacy compared to water | NA | 4 |
| Visual observation | High smoke | Very less smoke |

II. Lateral Ignition Flame Retardant Test (LIFT Test)

To evaluate the protective action of the fire-retardant composition, test was conducted by coating the surface with fire-retardant composition prior to ignition. Test was conducted as per ASTM E1321-18 specification with customization based on available resources. Two plywood of 155× 155 mm having 12 mm thickness were taken and coated with 0.5% w/w composition and 1% w/w composition of Example-1 respectively. Two control were also taken under testing, one coated with water and another dried with no water. The coated plates were placed vertically in parallel to the 40 KW heat source. It was found that uncoated plywood and the plywood coated with water ignited within 30 seconds of its exposure with the radiant source. However, plywood coated with 0.5% w/w composition took around 80 seconds and the plywood coated with 1% w/w composition took around 338 seconds to ignite. This suggested that fire-retardant composition is quite effective in protecting the objects/surfaces prone to catch fire. Fire-retardant composition with higher concentration may protect objects/surfaces for even longer duration. Results are summarised in Table 6.

TABLE 6

| Parameter | Control (without water) | Control (with water) | 0.5% of Example 1 composition | 1% of Example 1 composition |
|---|---|---|---|---|
| Plywood Dimension (mm) | 155 × 155 × 12 | 155 × 155 × 12 | 155 × 155 × 12 | 155 × 155 × 12 |
| Wood moisture (%) | 8 | 8 | 8 | 8 |
| Radiant Heat kW | 40 | 40 | 40 | 40 |
| Material ignition time (s) | 19 | 24 | 80 | 338 |

III. Cone calorimeter Test

To determine the protection effectiveness of the present invention material ignition test was conducted using Cone calorimeter with ISO 5660. The 100×100 mm plywood of 12 mm thickness was coated with experiment 1 composition, including control without water and with water. The coated plates were placed parallelly but in horizontal position to the 40 KW heat source. It was found that uncoated plywood and the plywood coated with water ignited within 20 seconds of its exposure with the radiant source. However, plywood coated with 0.5% w/w composition took around 132 seconds. The results have been summarised in table 5.

It is clear from the experimental data, as described above, the composition for fire-fighting disclosed in the present invention is found better in performance. The fire-retardant composition of the present invention has many advantages such as high-water absorption capacity, low and high temperature resistance, fire extinguishing/suppression efficiency, bio-degradability and resulting in the environment friendly decomposition products. The process disclosed in the present disclosure is a one pot mixing of all ingredients of the composition which results in high percentage yield and purity of the final product which results in the better performance of the final product. The process described is simple, convenient to perform and does not require any heavy instruments. Thus, the fire-retardant composition described in the present invention is useful in preventing, retarding, suppressing and/or extinguishing fire. Although the subject matter has been described in considerable detail with reference to certain preferred embodiments thereof, other embodiments are possible. As such, the spirit and scope of the disclosure should not be limited to the description of the preferred embodiment contained therein.

We claim:

1. A fire-retardant composition having a viscosity of 300 cps to 2500 cps comprising: a fire-retardant pre-mix, and water, wherein the fire-retardant pre-mix comprises:
   a superabsorbent polymer;
   a water insoluble inorganic powder viscosity control agent; and
   an antimicrobial agent;
   wherein said superabsorbent polymer is selected from the group consisting of starch-g-poly (2-propenamide-co-2-propenoic acid) potassium salt, starch-g-poly (2-propenamide-co-2-propenoic acid) sodium salt, starch-g-poly (propenoic acid) sodium salt, starch-g-poly (propenoic acid) potassium salt, sodium polyacrylamide, and potassium polyacrylamide;
   wherein, said antimicrobial agent is selected from group consisting of paraben, bronopol (2-bromo-2-nitropropane-1,3-diol), sodium benzoate, 5-chloro-2-(2,4-dichlorophenoxy)phenol, mixture of 5 Chloro-2-Methyl-4-isothiazolin-3-one and 0.52% 2-Methyl-4-isothiazolin-3-one, 1,2-benzisothiazolin-3-one, reputain, natamycin, and nisin.

2. The fire-retardant pre-mix composition as claimed in claim 1, wherein said fire-retardant pre-mix composition comprises:
   0.01% w/w to 99% w/w of the superabsorbent polymer;
   0.01% w/w to 50% w/w of the viscosity control agent; and
   0.001% w/w to 5% w/w of the antimicrobial agent.

3. The fire-retardant composition as claimed in claim 1, wherein said viscosity control agent is a water-insoluble inorganic powder selected from the group consisting of amorphous silica, silicon dioxide, silicic acid, silicates, titanium dioxide, aluminium oxide, magnesium oxide, zinc oxide, talc, calcium phosphate, clays, diatomataceous earth, zeolites, bentonite, kaolin, hydrotalcite, and activated clays.

4. The fire-retardant composition as claimed in claim 1, wherein said viscosity control agent is an amorphous silica.

5. The fire-retardant composition as claimed in claim 1, having a viscosity ranging from 300-2000 cps.

6. The fire-retardant composition as claimed in claim 1, having a viscosity ranging from 1500-2000 cps.

7. The fire-retardant composition as claimed in claim 2, wherein said fire-retardant pre-mix composition comprises
- 0.01% w/w to 99% w/w of the superabsorbent polymer;
- 0.01% w/w to 50% w/w of the viscosity control agent; and
- 0.001% w/w to 5% w/w of the antimicrobial agent;
- wherein said fire-retardant composition has a viscosity ranging from 1500-2000 cps.

8. A method of preventing or extinguishing fire, comprising directing the fire-retardant composition of claim 5 to a surface to prevent or extinguish fire.

9. The method of preventing fire as claimed in claim 8, comprising coating objects and surfaces prone to catch fire with the fire-retardant composition.

10. The method of extinguishing fire as claimed in claim 8, comprising directing onto burning objects and surfaces the fire-retardant water mixture to suppress fire.

11. The fire-retardant pre-mix composition as claimed in claim 2, wherein the antimicrobial agent is selected from 2-bromo-2-nitropropane-1,3-diol, a mixture of 5 chloro-2-methyl-4-isothiazolin-3-one and 0.52% 2-methyl-4-isothiazolin-3-one, and 1,2-benzisothiazolin-3-one.

* * * * *